(12) United States Patent
Hwang et al.

(10) Patent No.: US 10,761,632 B2
(45) Date of Patent: Sep. 1, 2020

(54) DISPLAY DEVICE WITH TOUCH SENSOR FOR SUPPRESSING DETERIORATION OF IMAGE QUALITY CAUSED BY CAPACITOR IN TOUCH SENSOR UNIT AND METHOD FOR MANUFACTURING SAME

(71) Applicant: LG DISPLAY CO., LTD., Seoul (KR)

(72) Inventors: KwangJo Hwang, Gyeonggi-do (KR); Sangkyu Kim, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 8 days.

(21) Appl. No.: 16/190,217

(22) Filed: Nov. 14, 2018

(65) Prior Publication Data

US 2019/0155430 A1 May 23, 2019

(30) Foreign Application Priority Data

Nov. 17, 2017 (KR) .......................... 10-2017-0154343

(51) Int. Cl.
*G06F 3/041* (2006.01)
*G06F 3/044* (2006.01)
*G09G 3/3233* (2016.01)

(52) U.S. Cl.
CPC ............ *G06F 3/0412* (2013.01); *G06F 3/044* (2013.01); *G06F 3/0416* (2013.01); *G06F 3/0443* (2019.05); *G06F 3/0448* (2019.05); *G06F 3/04164* (2019.05); *G09G 3/3233* (2013.01); *G06F 2203/04103* (2013.01); *G09G 2300/0452* (2013.01); *G09G 2320/0295* (2013.01); *G09G 2320/043* (2013.01); *G09G 2320/0693* (2013.01); *G09G 2354/00* (2013.01)

(58) Field of Classification Search
CPC ......... G06F 2203/04103; G06F 3/0412; G06F 3/0416; G06F 3/04164; G06F 3/044; G06F 3/0443; G06F 3/0448; G09G 2300/0452; G09G 2320/0295; G09G 2320/043; G09G 2320/0693; G09G 2354/00; G09G 3/3233
See application file for complete search history.

(56) References Cited

U.S. PATENT DOCUMENTS

| | | | |
|---|---|---|---|
| 2015/0378486 A1* | 12/2015 | Yu .......................... | G06F 3/0412 345/174 |
| 2016/0328071 A1* | 11/2016 | Yan .......................... | G06F 3/044 |
| 2018/0308902 A1* | 10/2018 | Lee ......................... | H01L 27/323 |
| 2018/0373366 A1* | 12/2018 | Li ........................... | H01L 25/13 |

* cited by examiner

*Primary Examiner* — Chun-Nan Lin
(74) *Attorney, Agent, or Firm* — Polsinelli PC

(57) ABSTRACT

The present disclosure provides a display device including: a transparent substrate; a circuit unit disposed on the transparent substrate and comprising a plurality of circuit areas and a plurality of light-emitting areas respectively corresponding to the plurality of circuit areas; a plurality of touch electrode rows, one of the plurality of touch electrode rows comprising a plurality of sub-touch electrodes disposed to overlap the plurality of light-emitting areas and a plurality of first connection portions configured to connect the plurality of sub-touch electrodes in a first direction; and a touch wiring line extending in a second direction and configured to supply a touch signal to one sub-touch electrode of the plurality of touch electrode rows. A method of manufacturing the display device is also provided.

12 Claims, 13 Drawing Sheets

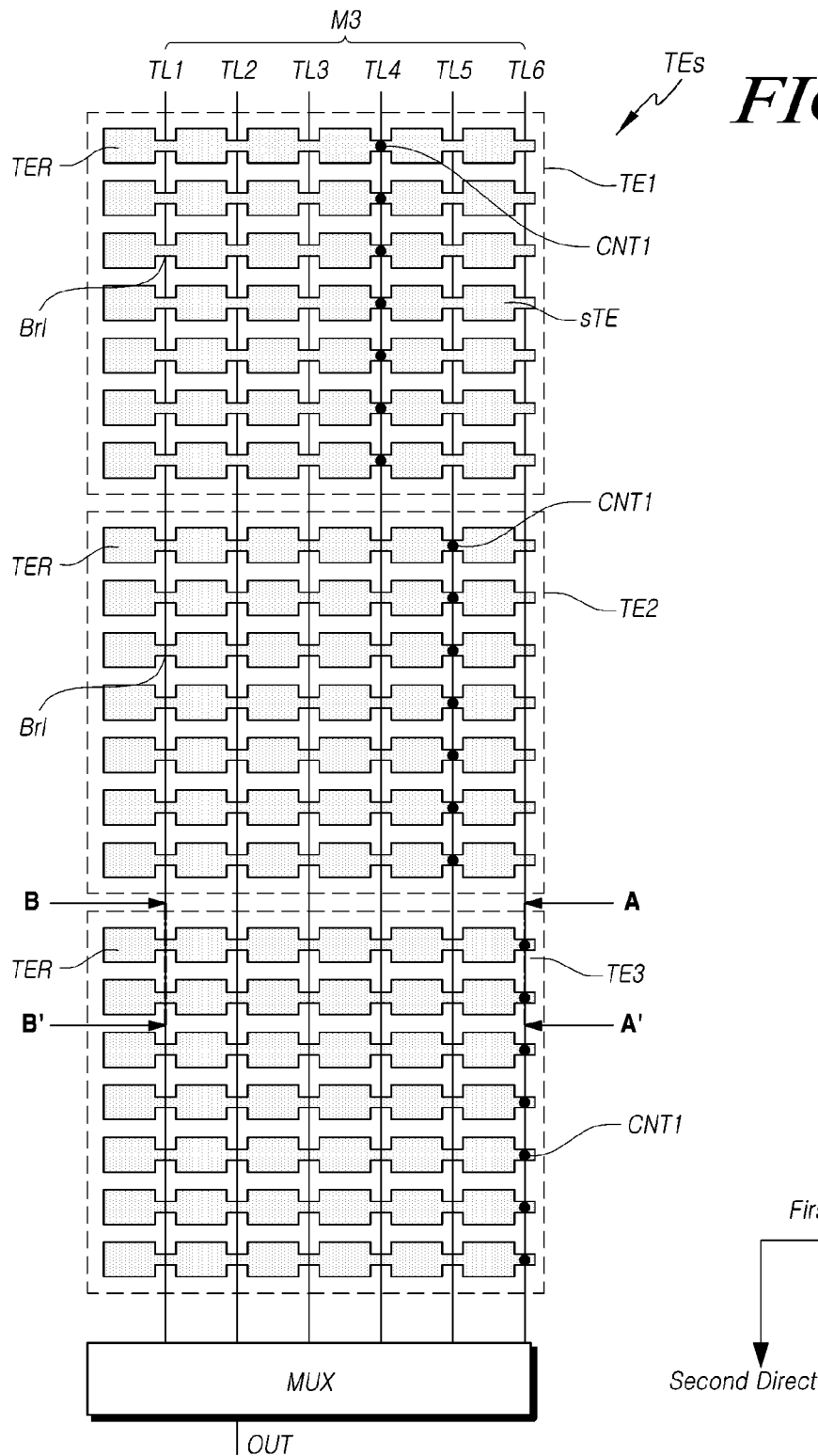

FIG.5B
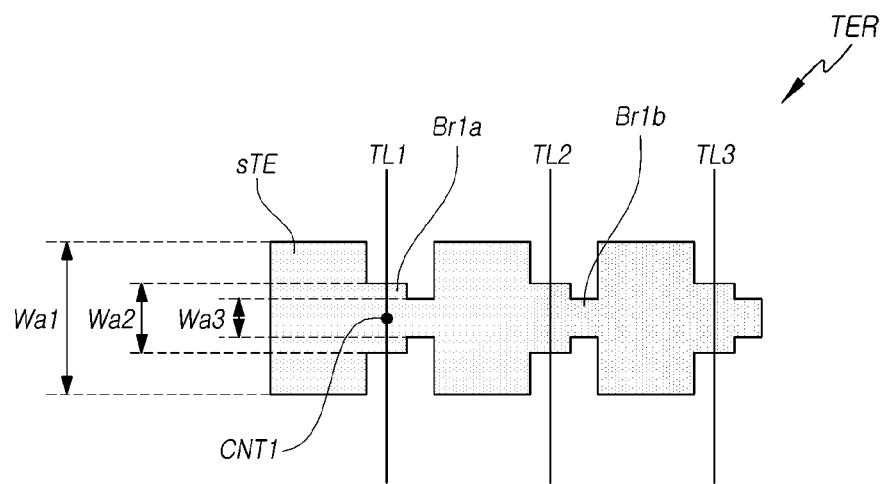
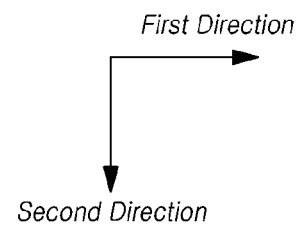

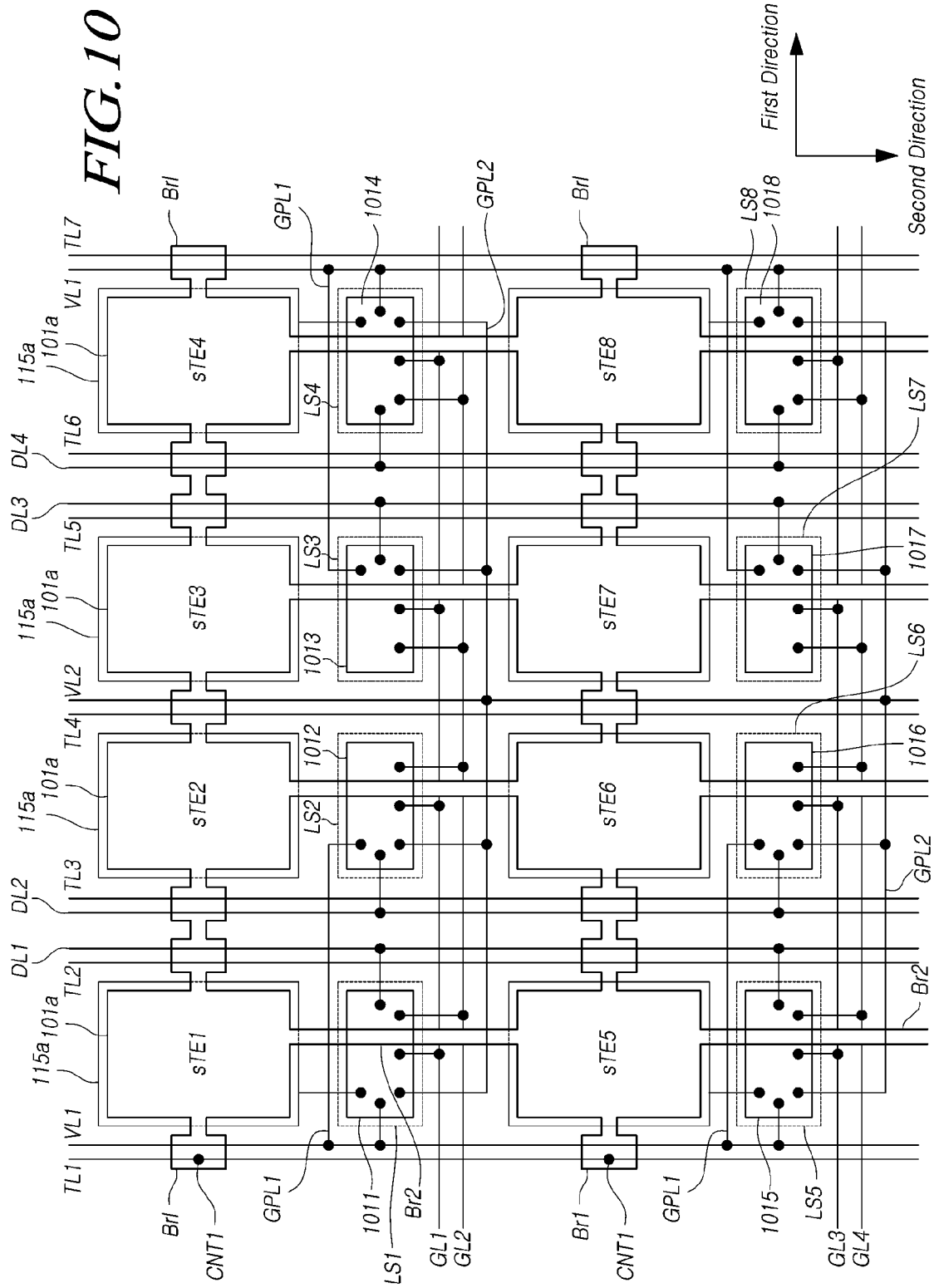

DISPLAY DEVICE WITH TOUCH SENSOR FOR SUPPRESSING DETERIORATION OF IMAGE QUALITY CAUSED BY CAPACITOR IN TOUCH SENSOR UNIT AND METHOD FOR MANUFACTURING SAME

CROSS REFERENCE TO RELATED APPLICATION

This application claims priority from Korean Patent Application No. 10-2017-0154343, filed on Nov. 17, 2017, which is hereby incorporated by reference in its entirety for all purposes as if fully set forth herein.

BACKGROUND OF THE DISCLOSURE

Field of the Disclosure

Aspects disclosed herein relate to a display device including a touch sensor and a method for manufacturing the same.

Description of the Background

Demand for display devices for displaying an image these days is increasing in various forms, and various types of display devices, such as Liquid Crystal Display (LCD) devices, plasma display devices, and Organic Light-Emitting Display (OLED) devices, are being utilized.

Among the above-mentioned display devices, OLED devices, which are self-luminous devices, have been recently spotlighted because OLED devices are excellent in response speed, viewing angle, color reproducibility, and the like, and can be implemented thinly.

In addition, a display device may operate by receiving a user's command input through various input devices such as a keyboard or a mouse, and a touch panel has been developed as an input device of a display device, which enables a user's command to be intuitively and conveniently input by touching the screen of the display device. The touch panel may be disposed on the screen of the display device, and the display device may receive the input of a user's command when the user touches a specific point on the screen of the display device. In addition, the touch panel is embedded in the display device so as to be integrated with the display device. The touch panel integrated with the display device may be referred to as a touch sensor unit.

In recent years, studies have been actively made on a narrow bezel technique for narrowing the width of the rim of a display device for reasons of design and the like. In addition, when the touch sensor unit is integrated with the display device, signal wiring lines for driving the display device and signal wiring lines for driving the touch sensor unit are disposed in the rim of the display device, which makes it impossible to implement the bezel narrowly.

When the touch sensor unit is integrated with the display device, the distance between the circuit of the display device and the circuit of the touch sensor unit can be reduced. In addition, when the touch sensor unit adopts an electrostatic capacity scheme, a signal transmitted to the display device may be distorted by a capacitor in the touch sensor unit.

SUMMARY

Accordingly, the present disclosure is to provide a display device including a touch sensor that is capable of suppressing deterioration of image quality, and a method of manufacturing the display device.

In addition, the present disclosure is to provide a display device including a touch sensor that is applicable to a narrow bezel, and a method of manufacturing the display device.

In one aspect, aspects disclosed herein are capable of providing a display device including: a transparent substrate; a circuit unit disposed on the transparent substrate and including a plurality of circuit areas and a plurality of light-emitting areas respectively corresponding to the plurality of circuit areas; a plurality of touch electrode rows, one of the plurality of touch electrode rows including a plurality of sub-touch electrodes disposed to overlap the plurality of light-emitting areas and a plurality of first connection portions configured to connect the plurality of sub-touch electrodes in a first direction; and a touch wiring line extending in a second direction and configured to supply a touch signal to one sub-touch electrode of the plurality of touch electrode rows.

In another aspect, aspects disclosed herein are capable of providing a display device including a plurality of touch electrode rows extending in a first direction and disposed at a predetermined interval, and a plurality of touch wiring lines extending in a second direction, a touch driving signal being transmitted to the touch wiring lines. Among the plurality of touch electrode rows, one touch electrode row includes a plurality of sub-touch electrodes and a plurality of first connection portions that are narrower than the sub-touch electrodes, the plurality of touch wiring lines are disposed to overlap the first connection portions, and, among touch wiring lines, one touch wiring line is in contact with the touch electrode row in at least one of the first connection portions.

In another aspect, aspects disclosed herein are capable of providing a method of manufacturing a display device. The method may include forming, on a transparent substrate, a touch electrode including a plurality of touch electrode rows extending in a first direction at a predetermined interval, and connecting a touch wiring line to a point of the touch electrode; forming, on the touch wiring line, a plurality of transistors and wiring lines configured to apply a signal to the plurality of transistors; forming a light-emitting element connected to at least one of the plurality of transistors; and forming an encapsulation on the light-emitting element.

According to aspects of the present disclosure, it is possible to provide a display device including a touch sensor that is capable of suppressing deterioration in image quality, and a method of manufacturing the display device.

In addition, according to aspects of the present disclosure, it is possible to provide a display device including a touch sensor that is applicable to a narrow bezel, and a method of manufacturing the display device.

BRIEF DESCRIPTION OF THE DRAWINGS

The above and other aspects, features and advantages of the present disclosure will be more apparent from the following detailed description taken in conjunction with the accompanying drawings, in which:

FIG. 5A is a plan view illustrating an example of touch electrodes disposed in the display device illustrated in FIG. 1;

FIG. 5B is a plan view illustrating an example of touch electrode rows according to aspects of the present disclosure;

FIG. 10 is a plan view illustrating an example of a display device in which touch electrodes illustrated in FIG. 9A are disposed.

DETAILED DESCRIPTION

Figure 1:
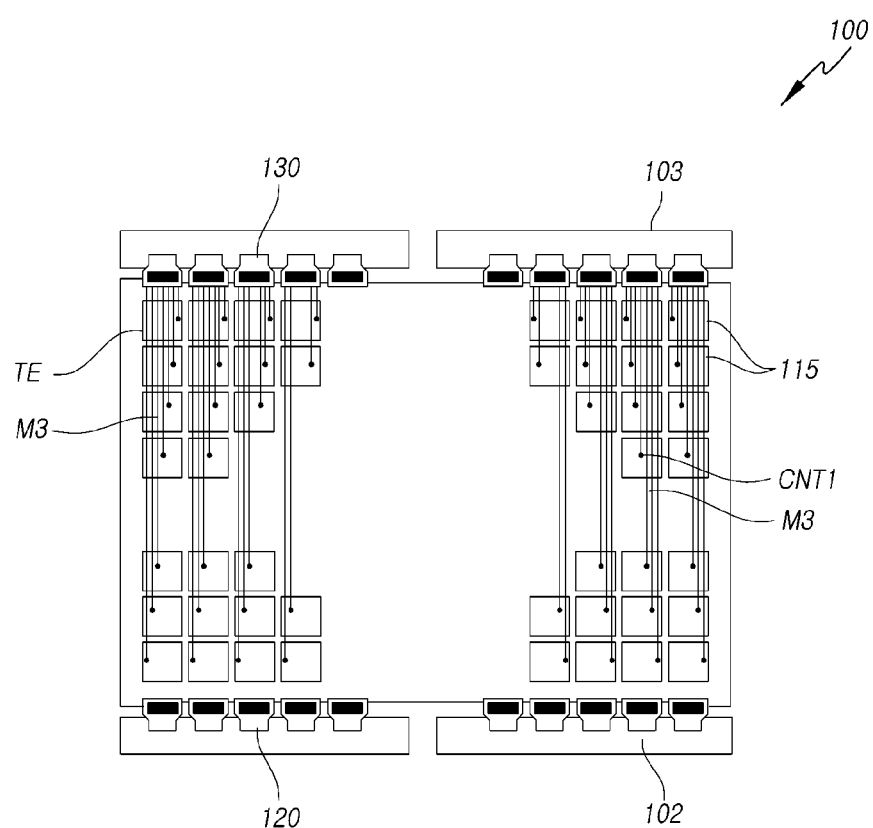
FIG. 1 is a diagram illustrating a configuration of an example of a display device including a touch sensor unit according to aspects of the present disclosure.

Hereinafter, some aspects of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one component from other components, and the property, order, sequence and the like of the corresponding component are not limited by the corresponding term. In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 2:
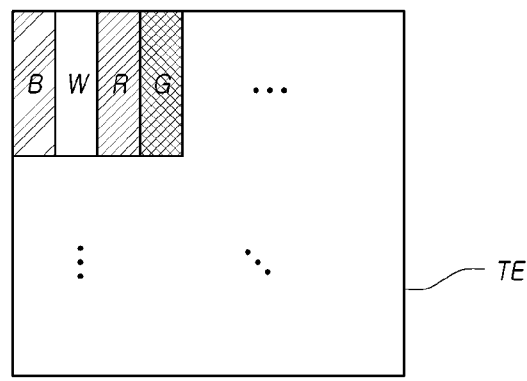
FIG. 2 is a conceptual diagram illustrating an example of a relationship between the sensing unit and the sub-pixels, which are illustrated in FIG. 1.

FIG. 1 is a diagram illustrating a configuration of an example of a display device including a touch sensor unit according to aspects of the present disclosure, and FIG. 2 is a conceptual diagram illustrating an example of a relationship between the sensing unit and the sub-pixels, which are illustrated in FIG. 1.

Referring to FIGS. 1 and 2, a display device 100 may include a display panel 110 configured to display an image, a touch sensor unit 115 configured to sense a touched point on the display panel 110, a plurality of driving drivers 120 configured to drive the display panel 110, and a plurality of sensing drivers 130 configured to drive the touch sensor unit 115.

The display panel 110 includes a plurality of pixels (not illustrated) and is capable of displaying an image by a data signal transmitted corresponding to a gate signal. The display panel 110 may be an LCD device or an OLED device. However, the present disclosure is not limited thereto.

The touch sensor unit 115 includes a plurality of touch electrodes TE and may be disposed on the display panel 110. The plurality of touch electrodes TE is capable of sensing a touch using a change in capacitance caused by a touch. Here, the touch may mean touching the display panel 110 with a hand or stylus pen, and may include hovering close to the display panel 110 as well as a direct touch. The number of the plurality of touch electrodes TE may correspond to the size of the display panel 110.

As illustrated in FIG. 2, a plurality of sub-pixels R, G, B, and W may be disposed under one touch electrode TE. The plurality of sub-pixels R, G, B, and W may emit light corresponding to a data signal and a gate signal. Here, the subpixels R, G, B, and W are illustrated as all of emitting red light, green light, blue light, and white light, but the present disclosure is not limited thereto.

In addition, the touch sensor unit 115 may include a plurality of touch wiring lines M3. Each of the plurality of touch wiring lines M3 may be connected to one touch electrode TE. The touch wiring lines M3 are disposed on a layer different from the touch electrodes TE and may be disposed so as to overlap the touch electrodes TE. Also, one touch wiring line M3 may be connected to a touch electrode TE through a first contact hole CNT1 disposed at at least one point of the touch electrode TE.

The plurality of driving drivers 120 may be disposed at the lower end of the display panel 110 and may supply a driving signal including a data signal and a gate signal to the display panel 110. The plurality of driving drivers 120 may include data driving drivers each configured to transmit a data signal and gate drivers each configured to transmit a gate signal. The gate drivers may be drivers disposed at the leftmost and the rightmost among the plurality of driving drivers. The plurality of sensing drivers 130 are disposed at the top end of the display panel 110 and may transmit/receive a touch signal to/from the touch electrodes TE through the touch wiring lines M3. The touch signal may include a touch driving signal and a touch sensing signal. In addition, the plurality of sensing drivers 130 may transmit a touch driving signal to the touch electrodes TE and may receive a touch sensing signal from the touch electrodes TE.

The plurality of driving drivers 120 may be disposed under the display panel 110 and may transmit a driving signal including a gate signal and a data signal to the display panel 110. In addition, the plurality of sensing drivers 130 may be disposed above the display panel 110 and may transmit and receive a touch signal. A terminal for applying a signal may not be disposed on the left and right sides of the display panel 110. Since the touch electrodes disposed on the display panel 110 are capable of transmitting/receiving a touch signal through one touch wiring line, the number of terminals required for transmitting/receiving a touch signal can be reduced. Therefore, the number of signals output from the sensing drivers 130 can be reduced, and the sensing drivers 130 having a smaller size compared to the number of the touch wiring lines M3 can be used. Accordingly, the size of the sensing drivers 130 disposed at the upper end of the display panel 110 can be reduced and no terminal exists on the left and right sides of the display panel 110. Thus, the bezel area of the display panel 110 in which wiring lines are disposed can be implemented with a narrow width.

In addition, the plurality of driving drivers 120 can be driven by receiving signals from the outside through a first board 102 and the plurality of sensing drivers 130 can be driven by receiving signals from the outside through a second board 103. Here, the number of the plurality of driving drivers 120 and the plurality of sensing drivers 130 may be determined corresponding to the size and resolution of the display panel 110. In addition, the driving drivers 120 and the sensing drivers 130 may each include an integrated circuit.

Figure 3:
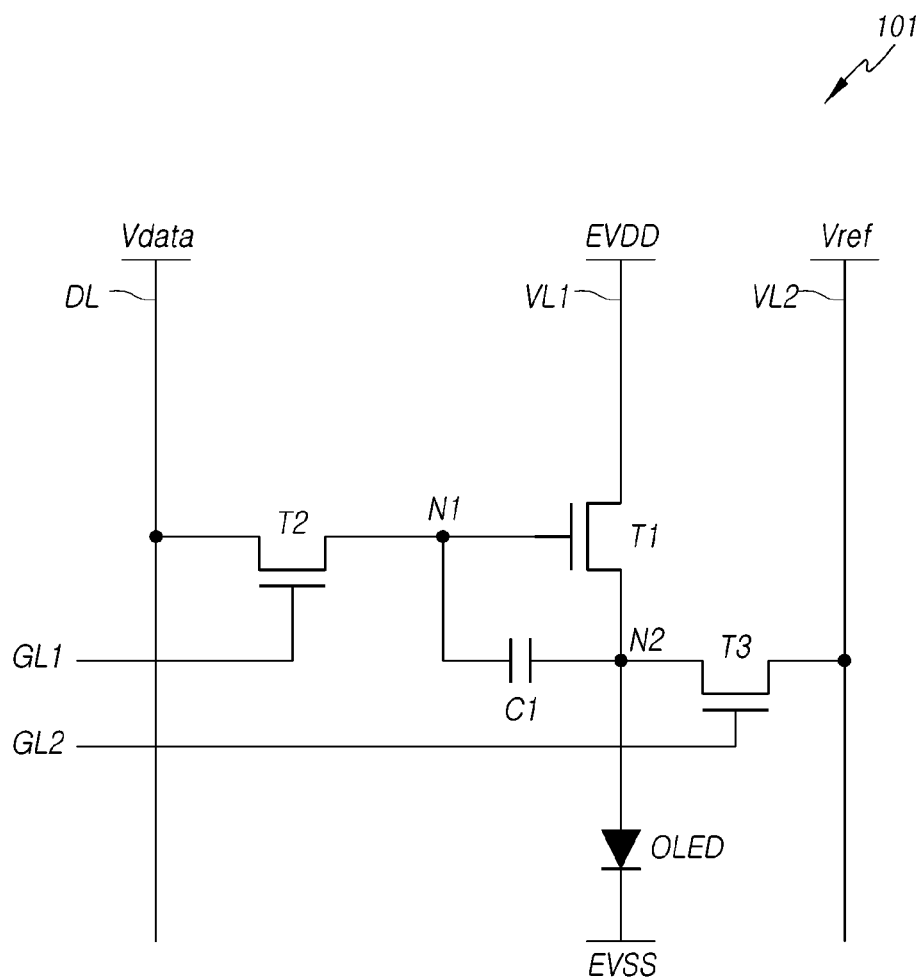
FIG. 3 is a circuit diagram illustrating a sub-pixel according to aspects of the present disclosure.

FIG. 3 is a circuit diagram illustrating a sub-pixel according to aspects of the present disclosure.

Referring to FIG. 3, a sub-pixel 101 may include a pixel circuit including an OLED, first to third transistors T1 to T3, and a capacitor C1. Here, the first transistor T1 may be a driving transistor that drives a driving current flowing in the OLED.

The first transistor T1 may have a first electrode connected to a first voltage line VL1 to receive a first voltage EVDD, a second electrode connected to a second node N2, and a gate electrode connected to a first node N1. In addition, the second transistor T2 may have a first electrode connected to a data line DL, a second electrode connected to the first node N1, and a gate electrode connected to a first gate line GL1. Further, the third transistor T3 may have a first electrode connected to the second node N2, a second electrode connected to a second voltage line VL2, and a gate electrode connected to a second gate line GL2. The first voltage line VL1 may receive the first voltage EVDD and the second voltage line VL2 may receive a reference voltage Vref.

The OLED may have an anode electrode connected to the second node N2 and a cathode electrode, to which a second voltage EVSS may be transmitted. The cathode electrode may be connected to a common power supply configured to supply the second voltage EVSS. The second voltage EVSS may be ground. Therefore, the driving current supplied through the first transistor T1 may flow in the OLED. In addition, a capacitor C1 may be connected between the first node N1 and the second node N2 and may maintain a voltage applied to the first node N1.

When the second transistor T2 is turned on in response to the gate signal transmitted to the first gate line GL1, the data signal transmitted through the data line DL may be transmitted to the first node N1. The data signal may have a predetermined voltage corresponding to a gradation. The first transistor T1 is capable of causing the driving current to flow toward the second node N2 by the data signal. The capacitor C1 may be configured to maintain the voltage of the first node N1.

When the third transistor T3 is turned on by the gate signal transmitted to the second gate line GL2, the reference voltage Vref may be transmitted to the second node N2. In addition, the voltage of the second node N2 may be used to sense the magnitude of the driving current flowing through the OLED. The threshold voltage of the first transistor T1 may be sensed by sensing the voltage of the second node N2. However, the present disclosure is not limited thereto.

Figure 4:
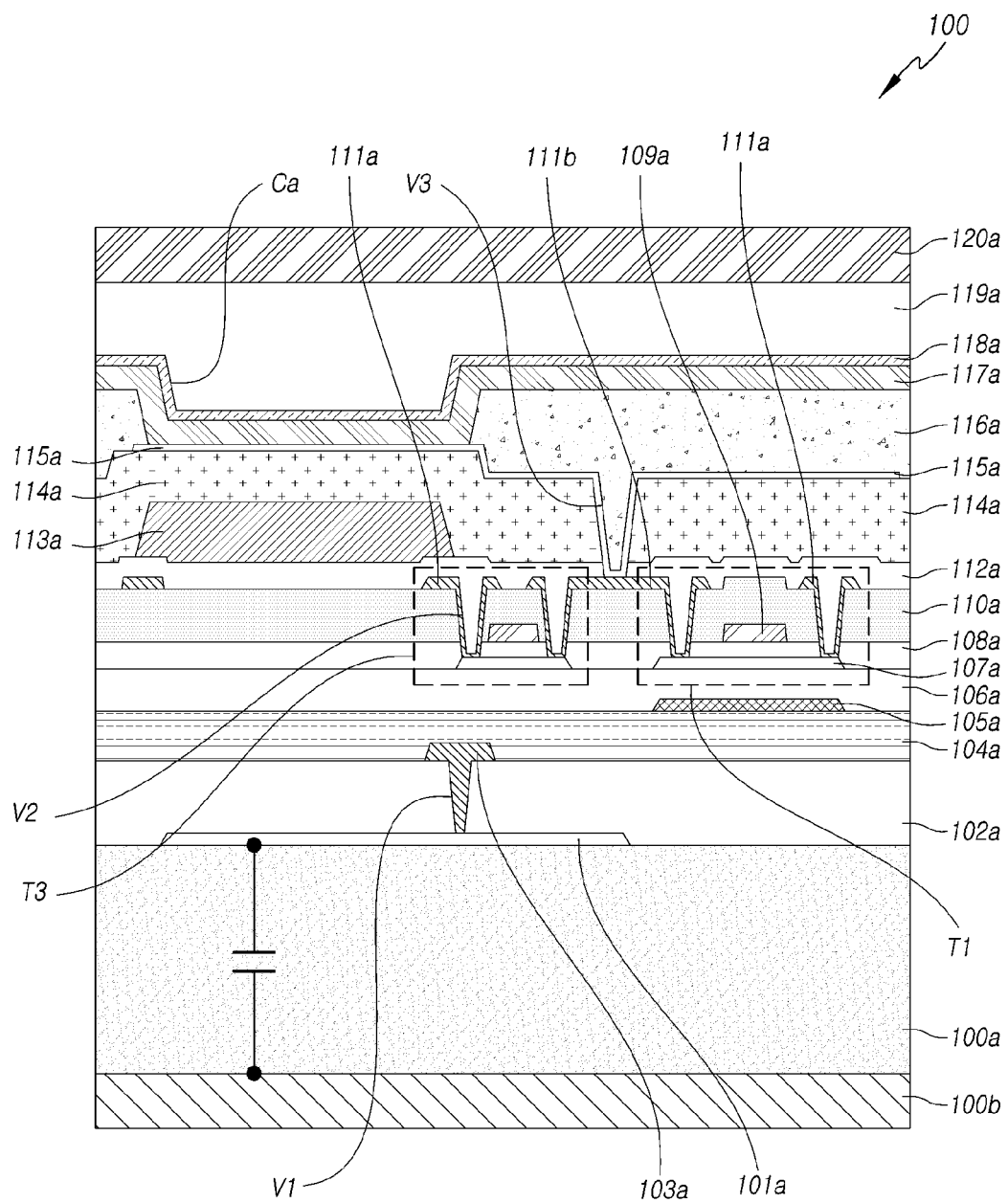
FIG. 4 is a cross-sectional view illustrating an example of the display device illustrated in FIG. 1.

FIG. 4 is a cross-sectional view illustrating an example of the display device including a touch sensor unit illustrated in FIG. 1.

Referring to FIG. 4, the display device 100 may include a transparent electrode 101a on a transparent substrate 100a. The transparent electrode 101a disposed on the transparent substrate 100a may be formed as a transparent electrode of Indium Tin Oxide (ITO), Indium Zinc Oxide (IZO), or the like. The transparent electrode 101a may be the touch electrode TE illustrated in FIG. 1. In the transparent substrate 100a, a polarization layer 100b may be disposed on a surface opposite the surface on which the transparent electrode 101a is formed. After a first insulating film 102a is disposed on the transparent electrode 101a, a metal wiring line 103a may be patterned and disposed on the first insulating film 102a. When the metal wiring line 103a is disposed, a contact hole is formed in the first insulating film 102a and a first via V1 is formed in the contact hole so that the metal wiring line 103a is capable of coming into contact with the transparent electrode 103a at one point via the first via V1. The metal wiring line 101a may be the touch wiring line M3 illustrated in FIG. 1. A second insulating film 104a may be disposed on the first insulating film 102a on which the metal wiring line 103a is disposed, and a metal layer 105a may be patterned and disposed on the second insulating film 104a. A third insulating film 106a may be disposed on the metal layer 105a.

After the third insulating film 106a is disposed, an active layer 107a may be disposed on the third insulating film 106a and a gate insulating film 108a may be disposed on the active layer 107a. The gate electrode 109a can be disposed on the gate insulating film 108a by patterning and disposing a gate metal on the gate insulating film 108a. An interlayer insulating film 110a may be disposed on the gate insulating film 108a disposed on the gate electrode 109a. A source electrode 111a and a drain electrode 111b may be disposed on the interlayer insulating film 110a by patterning and disposing a source drain metal on the interlayer insulating film 110a. A contact hole is formed in the interlayer insulating layer 110a and the gate insulating layer 108a and the source electrode 111a and the drain electrode 111b may be connected to the active layer 107a through the second via V2 formed in the contact hole. Here, it is illustrated that since two active layers 107a, two gate electrodes 109a, two source electrodes 111a, and two drain electrodes 111b are disposed, two thin film transistors are disposed. However, this is merely for explanation, and a plurality of thin film transistors may be disposed in the display device 100. In addition, the two thin film transistors illustrated here may be the first transistor T1 and the third transistor T3 illustrated in FIG. 3. In addition, the metal layer 105a may be disposed at a position overlapping the active layer 107a, the source electrode 111a, and the drain electrode 111b, which correspond to the first transistor T1 shown in FIG. 3. In addition, the metal layer 105a may perform a role of preventing the light, transmitted through the transparent substrate 100a, from being transmitted to the active layer of the first transistor T1 illustrated in FIG. 3. The metal layer 105a may be referred to as a light shielding layer.

The flattening film 112a may be deposited on the source electrode 111a and the drain electrode 111b. A color filter 113a may be disposed on the flattening film 112a. The color filter 113a may be disposed at a position corresponding to the transparent electrode 101a. In addition, the color filter 113a may be disposed at a position overlapping the transparent electrode 101a. A passivation layer 114a may be disposed on the flattening film 112a on which the color filter 113a is disposed and an anode electrode 115a may be disposed on the passivation layer 114a. The anode electrode 115a may be a transparent electrode. A contact hole is formed in the flattening film 112a and the passivation layer 114a and a third via V3 is formed through the contact hole, so that the anode electrode 115a can be connected to the drain electrode 111b through the third via V3.

A bank 116a may be disposed on the anode electrode 115a. The bank 116a may include a cavity Ca disposed in an area corresponding to the color filter 114a. Further, the cavity Ca may be disposed in an area overlapping the color filter 113a. The anode electrode 115a may not be covered with the bank 116a due to the cavity Ca. An organic light-emitting layer 117a may be disposed on the bank 116a and on the anode electrode 115a in the cavity Ca. Here, the organic light-emitting layer 117a may be disposed only on the anode electrode 115a in the cavity Ca. In addition, a cathode electrode 118a may be disposed on the organic light-emitting layer 117a. The cathode electrode 118a may be a common electrode. The cathode electrode 118a may be a transparent electrode. An adhesive layer 119a may be formed on the cathode electrode 118a and an encapsulation 120a may be bonded to the cathode electrode 118a. The adhesive layer 119a may include epoxy. The encapsulation 120a may include a metal. In addition, the encapsulation 120a may be opaque. However, the present disclosure is not limited thereto. It is possible to prevent moisture and/or foreign matter from penetrating into the organic light-emitting layer 117a by the encapsulation 120a. In addition, the anode electrode 115a, the organic light-emitting layer 117a, and the cathode electrode 118a may be referred to as an organic light-emitting diode, and the organic light-emitting layer 117a may emit light in response to a current flowing from the anode electrode 115a to the cathode electrode 118a.

In the display device 100 implemented as described above, light emitted from the organic light-emitting layer 117a may advance toward the side where the color filter 114a is present. In addition, the light having passed through the color filter 114a may be emitted to the outside through the transparent electrode 101a and the transparent substrate 100a. Accordingly, the color of the light emitted to the outside may be determined depending on the color of the color filter 114a. However, the present disclosure is not limited thereto, and the organic light-emitting layer 117a is capable of emitting red light, green light, blue light, and white light depending on corresponding sub-pixels, so that the color of light emitted to the outside by the organic light-emitting layer 117a can be determined. In addition, the color filter 114a may not be needed. The area where the transparent electrode 101a is disposed on the transparent substrate 100a may be referred to as a light-emitting area and the other area may be referred to as a circuit area.

The above-described display device allows the touch sensor unit to be included in the display device.

FIG. 5A is a plan view illustrating an example of touch electrodes disposed in the display device illustrated in FIG. 1, and FIG. 5B is a plan view illustrating an example of touch electrode rows according to aspects of the present disclosure.

Referring to FIGS. 5A and 5B, the display device 100 may include a plurality of touch electrodes TEs. Here, for convenience of explanation, three touch electrodes TEs located in the same column will be described as an example. Each of the touch electrodes TE1, TE2, and TE3 may include a plurality of touch electrode rows TER arranged at predetermined intervals. Although it is illustrated that one touch electrode TE includes seven touch electrode rows TER in this example, the present disclosure is not limited thereto. A touch electrode row TER may include a plurality of sub-touch electrodes sTE and first connection portions Br1 for connecting the plurality of sub-touch electrodes sTE in a first direction. In addition, the touch electrodes TE1, TE2, and TE3 may overlap the plurality of touch wiring lines M3.

The plurality of touch wiring lines M3 may extend in a second direction and may be disposed at regular intervals in the first direction. In addition, the touch wiring lines M3 may overlap the first connection portions Br1 of the touch electrode row TER. Here, the number of the plurality of touch wiring lines M3 overlapping each of the touch electrodes TE1, TE2, and TE3 is six, but the present disclosure is not limited thereto. The width of the first connection portions Brs1 in the second direction may be smaller than the width of the sub-touch electrode sTE in the second direction. The first connection portions Br1 may form a parasitic capacitance with one overlapping touch wiring line. By forming the width of the first connection portions Br1 to be narrower than that of the sub-touch electrodes sTE, the magnitude of the parasitic capacitance formed between the first connection portions Br1 and the one wiring line can be reduced.

Three touch electrodes TEs may be referred to as a first touch electrode TE1, a second touch electrode TE2, and a third touch electrode TE3 in the top to bottom direction, and six touch wiring line M3 may be referred to as a first touch wiring line TL1, a second touch wiring line TL2, a third touch wiring line TL3, a fourth touch wiring line TL4, a fifth touch wiring line TL5, and a sixth touch wiring line TL6 in the left to right direction. The first touch electrode TE is connected to the fourth touch wiring line TL4, the second touch electrode TE is connected to the fifth touch wiring line TL5, the third touch electrode TE is connected to the sixth touch wiring line TL6. The first to third touch wiring lines TL1 to TL3 may be connected to other unillustrated touch electrodes.

The first touch electrode TE1 may be connected to the first connection portions Br1 disposed at portions overlapping the fourth touch wiring line TL4 through contact holes CNT1, the second touch electrode TE2 may be connected to the first connection portions Br1 disposed at portions overlapping the fifth touch wiring line TL5 through contact holes CNT1, and the third touch electrode TE3 may be connected to the first connection portions Br1 disposed at portions overlapping the sixth touch wiring line TL6 through contact holes CNT1. Accordingly, each of the plurality of touch electrode rows TER forming one touch electrode TE is capable of transmitting/receiving touch signals through the same touch wiring line. Here, since the contact holes CNT1 for connecting the touch electrodes and the touch wiring lines can be formed in a single process, the same identification number is given thereto.

Referring to FIG. 5B, a first connection portion Br1 of a touch electrode row TER may include a first area Br1a overlapping a touch wiring line TL1, TL2, or TL3, and a second area Br1b connected to a neighboring sub-touch electrode sTE located in the same row. The width Wa2 of the first area Br1a in the second direction may be larger than the width Wa3 of the second area Br1b in the second direction. The first area Br1a may be provided with a contact hole CNT1, which is connected to the touch wiring line TL1. Therefore, an area where the contact hole CNT1 is to be disposed is secured in the first connection portion Br1, and connection between the touch wiring line TL1 and the first area Br1a may be facilitated.

In one aspect, the plurality of touch wiring lines M3 may be connected to one multiplexer MUX. The multiplexer MUX may select a signal to be transmitted to a plurality of terminals by a selection signal and may output the selected signal to one terminal, and may select one of the plurality of terminals by a selection signal and may output a signal to be input to one terminal to the selected terminal. Due to this, one output stage OUT of the sensing driver 130 illustrated in FIG. 1 is capable of outputting a plurality of touch signals sequentially, and capable of transmitting a plurality of touch signals to different touch wiring lines M3 through the multiplexer MUX.

One output stage OUT of the sensing driver 130 is capable of receiving a plurality of touch signals, transmitted from the plurality of touch wiring lines M3 through the multiplexer MUX, at different times. In the display device 100, it is possible to reduce the number of output stages OUT of the sensing drivers 130 by using the multiplexer MUX. Accordingly, the display device 100 is capable of using sensing drivers 130, which are smaller in size compared to the number of the touch wiring lines M3, so that the bezel corresponding to the rim portion of the display device 100 can be reduced.

Figure 6:
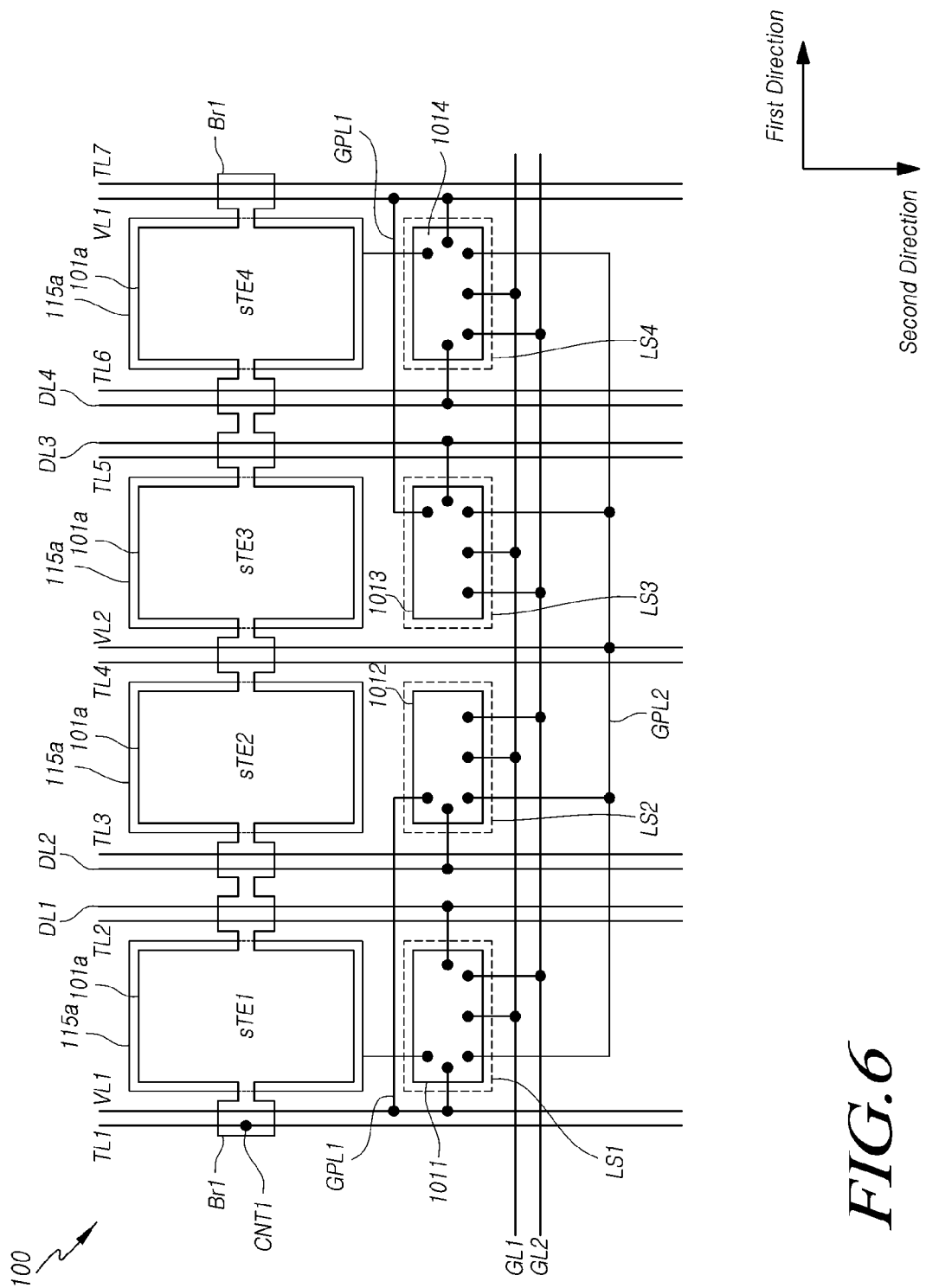
FIG. 6 is a plan view illustrating an example of a display device in which touch electrodes illustrated in FIG. 5A are disposed.

FIG. 6 is a plan view illustrating an example of a display device in which touch electrodes illustrated in FIG. 5A are disposed.

Referring to FIG. 6, the display device 100 may include a plurality of light-emitting areas and a circuit area including a plurality of circuit units 1011 to 1014, which correspond to the plurality of light-emitting areas, respectively. The plurality of light-emitting areas and the plurality of circuit units may be disposed on the transparent substrate 100a. The circuit units 1011 to 1014 may correspond to the pixel circuit of a subpixel illustrated in FIG. 3. However, the configurations of the circuit units 1011 to 1014 are not limited thereto.

In the light-emitting areas, the sub-touch electrodes sTE1, sTE2, sTE3, and sTE4 and the anode electrodes 115a may be disposed to overlap each other. One sub-touch electrode sTE1 may be connected to a neighboring sub-touch electrode sTE2 through a first connection portion Br1. When the sub-touch electrodes sTE1, sTE2, sTE3, and sTE4 are connected through the first connection portions Br1, one touch electrode row TER may be formed. The sub-touch electrodes sTE1, sTE2, sTE3, and sTE4 may be the transparent electrodes 101a illustrated in FIG. 4.

The circuit area may include the circuit units 1011 to 1014 configured to supply a driving current to the anode electrodes 115a, and a first power lines VL1, a reference power line VL2, data lines DL1 to DL4, and gate lines GL1 and GL2 configured to apply power and signals to the circuit units 1011 to 1014. In addition, the light shielding films LS1, LS2, LS3, and LS4 may be disposed in areas overlapping the circuit units 1011, 1012, 1013, and 1014. The light shielding films LS1, LS2, LS3, and LS4 may be the metal layer 105a illustrated in FIG. 4.

Further, four sub-pixels of the display device 100 correspond to one pixel, and correspond to red, green, blue, and white colors, respectively. However, the present disclosure is not limited thereto. One sub-pixel may correspond to one anode electrode 115a and one circuit unit.

FIG. 6 illustrates a plan view for one pixel, and a first sub-pixel, a second sub-pixel, a third sub-pixel, and a fourth sub-pixel may be sequentially disposed in the left to right direction. The first sub-pixel may correspond to blue color, the second sub-pixel may correspond to white color, the third sub-pixel may correspond to red color, and the fourth sub-pixel may correspond to green color. However, the present disclosure is not limited thereto. In addition, two first power lines VL1, one reference power line VL2, first to seventh touch wiring lines TL1 to TL7, and first to fourth data lines DL1 to DL4 extend in the second direction and may be disposed at predetermined intervals in the first direction.

The first power line VL1 and the first touch wiring line TL1 may be disposed on the left side of the first sub-pixel. The first data line DL1, the second data line DL2, the second touch wiring line TL2, and the third touch wiring line TL3 may be disposed between the first sub-pixel and the second sub-pixel. The reference power line VL2 and the fourth touch wiring line TL4 may be disposed between the second sub-pixel and the third sub-pixel. The third data line DL3, the fourth data line DL4, the fifth touch wiring line TL5, and the sixth touch wiring line TL6 may be disposed between the third sub-pixel and the fourth sub-pixel. In addition, the seventh touch wiring line TL7 and the second first power line VL1 may be disposed on the right of the fourth sub-pixel. In addition, anode electrodes 115a may be disposed above the sub-pixels, and the circuit units 1011 to 1014 may be disposed under the sub-pixels. In addition, the first gate line GL1 and the second gate line GL2 may be disposed under the circuit unit 1010. Here, the first data line DL1 transmits a data signal corresponding to blue color, the second data line DL2 transmits a data signal corresponding to white color, and the third data line DL3 transmits a data signal corresponding to red color, and the fourth data line DL4 may transmit a data signal corresponding to green color. However, the present disclosure is not limited thereto.

In addition, the circuit units 1011 to 1014 may be disposed between one touch electrode row and another touch electrode row illustrated in FIG. 5A. The touch electrode rows are arranged on anode areas corresponding to light-emitting areas, and the circuit units 1011 to 1014 are arranged in positions corresponding to non-light-emitting areas, thereby preventing the opening ratio of the display device from being lowered.

By making the sub-pixels share the first power line VL1 and the reference power line VL2, the first power lines VL1 and the reference power line VL2 are less than the number of the circuit units 1011 to 1014, so that the opening ratio of the display device 100 can be increased. In this case, since the first power source line VL1 is disposed adjacent to the first sub-pixel, so that the first circuit unit 1011 can be supplied with the first voltage EVDD by being connected to the first power line VL1. However, since the second circuit unit 1012 is not adjacent to the first power line VL1, it cannot be directly connected by the first circuit unit 1011. To this end, the second circuit unit 1012 may be connected to the first power line VL1 using a first jumping line GPL1.

Since the reference power line VL2 is not adjacent to the first sub-pixel but adjacent to the second sub-pixel, the first circuit unit 1011 cannot be directly connected to the reference power line VL2 by the second sub-pixel. A second jumping line GPL2 may be used in order to connect the first circuit unit 1011 to the reference power line VL2. In addition, since the second circuit unit 1012 is adjacent to the reference power line VL2, the reference power line VL2 can be directly connected to the second circuit unit 1012. The third circuit unit 1013 of the third sub-pixel and the fourth circuit unit 1014 of the fourth sub-pixel may be connected to the first power line VL1 and the reference power line VL2 in the same manner. In addition, the circuit area may be disposed to correspond to the interval between the touch electrode rows TER illustrated in FIG. 5A.

The first jumping line GPL1 and the second jumping line GPL2 may be formed of the metal layer 105a illustrated in FIG. 4. Accordingly, the first jumping line GPL1 and the second jumping line GPL2 may be formed together with the light shielding films LS1, LS2, LS3, and LS4. In addition, the first jumping line GPL1 and the second jumping line GPL2 may include the same material as the light shielding films LS1, LS2, LS3, and LS4. The first jumping line GPL1 and the second jumping line GPL2 may be connected to the first power line VL1 and the second voltage line VL2 through the contact holes CNT2 and CNT3, and may be connected to the first circuit unit 1011 and the second circuit unit 1012. In addition, the light shielding films LS1, LS2, LS3, and LS4 are capable of preventing light from being emitted to the circuit units 1011 to 1014.

Here, while the first power line VL1, the first to fourth data lines DL1 to DL4, and the reference power line VL2 are illustrated as being disposed parallel to the first to seventh touch wiring lines TL1 to TL7, the present disclosure is not limited thereto. The first touch wiring line TL1 and the seventh touch wiring lines TL7 may respectively overlap different first power lines VL1, the second touch wiring line TL2 and the third touch wiring line TL3 may overlap the first data line DL1 and the second data line DL2, the fourth touch wiring line TL4 may overlap the reference power line VL2. In addition, the fifth touch wiring line TL5 and the sixth touch wiring line TL6 may be disposed so as to overlap the third data line DL3 and the fourth data line DL4. The thickness of the first power line VL1 may be thicker than the thickness of the first touch wiring line TL1 or the seventh touch wiring line TL7. In addition, the thickness of the reference power line VL2 may be thicker than the thickness of the fourth touch wiring line TL4. In addition, the first connection portion Br1 disposed on the left of the first sub-touch electrode may be connected to the first touch wiring line TL1 through the contact hole CNT1. Here, while the first connection portion Br1 is illustrated as being connected to the first touch wiring line TL1 through the contact hole CNT1, the present disclosure is not limited thereto. Depending on the position of the touch electrode, the touch wiring line, which is overlapped by the contact hole CNT1, may be set differently and may also be connected to a touch wiring line other than the first touch wiring line TL1 through the contact hole CNT1.

Figure 7:
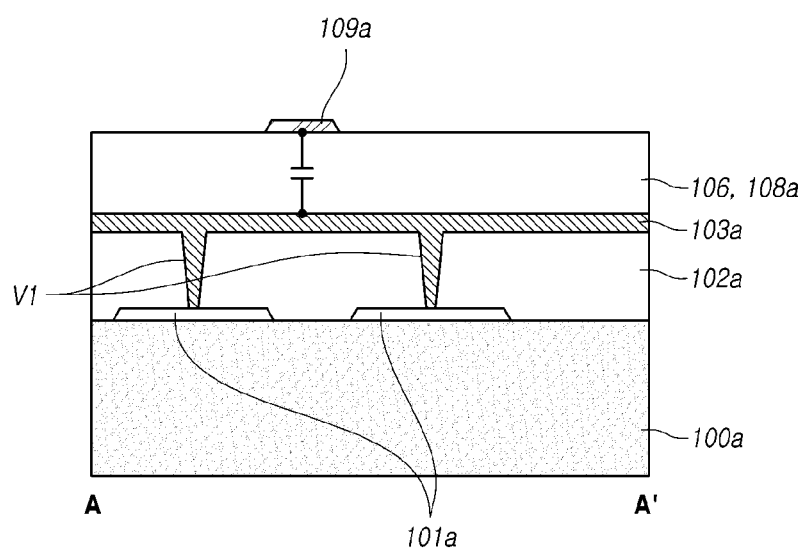
FIG. 7 is a cross-sectional view of a touch electrode, which is taken along line A-A' in FIG. 5A.
Figure 8:
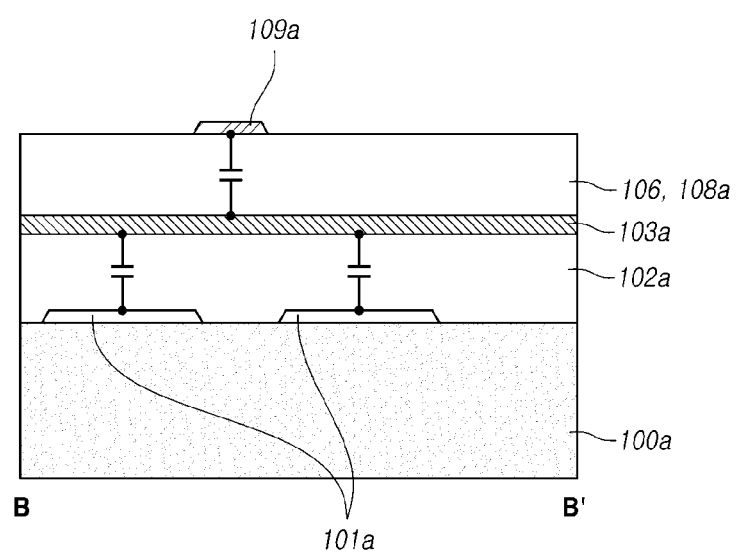
FIG. 8 is a cross-sectional view of a touch electrode, which is taken along line B-B' in FIG. 5A.

FIG. 7 is a cross-sectional view of a touch electrode, which is taken along line A-A' in FIG. 5, and FIG. 8 is a cross-sectional view of a touch electrode, which is taken along line B-B' in FIG. 5.

Referring to FIG. 7, a cross section of line A-A' of the display device is shown. In this case, since the touch electrode 101a and the touch wiring line 103 are connected through the first via V1, no parasitic capacitance may be formed between the touch electrode 101a and the touch wiring line 103a. Accordingly, a capacitance, which is formed between the gate electrode 109a and the touch wiring line 103a as the third insulating film 106a and the gate insulating film 108a are disposed, is expressed by Equation 1 as follows.

$$Cp1 = C1 \quad \text{Equation 1}$$

Here, Cp1 represents a parasitic capacitance in the cross section of line A-A', and C1 represents a capacitance formed between a touch wiring line and a wiring line disposed on the display panel.

Referring to FIG. 8, a cross section of line B-B' of the display device is shown. In this case, since no via is formed in the touch electrode 101a and the touch wiring line 103a, the touch electrode 101a and the touch wiring line 103a are not connected to each other, and thus a parasitic capacitance can be formed. Accordingly, a capacitance, which is formed between the gate electrode 109a and the touch wiring line 103a as the third insulating film 106a and the gate insulating film 108a are disposed, is expressed by Equation 2 as follows.

$$Cp2 = C1 | ((C2|C3)/C2C3) \quad \text{Equation 2}$$

Here, Cp2 represents a parasitic capacitance in the cross section of line B-B', C1 represents a capacitance formed between a touch wiring line and a wiring line disposed on the display panel, and each of C2 and C3 represents a capacitance formed between a touch electrode and a touch wiring line.

That is, an RC delay is generated to be different from position to position due to a deviation in capacitance, which is caused by a touch electrode, and thus, a signal may be distorted.

Here, while a parasitic capacitance is described as being formed between the touch wiring line 103a and the gate electrode 109a, the present disclosure is not limited thereto, and the parasitic capacitance may also be formed between the touch wiring line 103a and a source electrode, a drain electrode, and a data line.

Figure 9A:
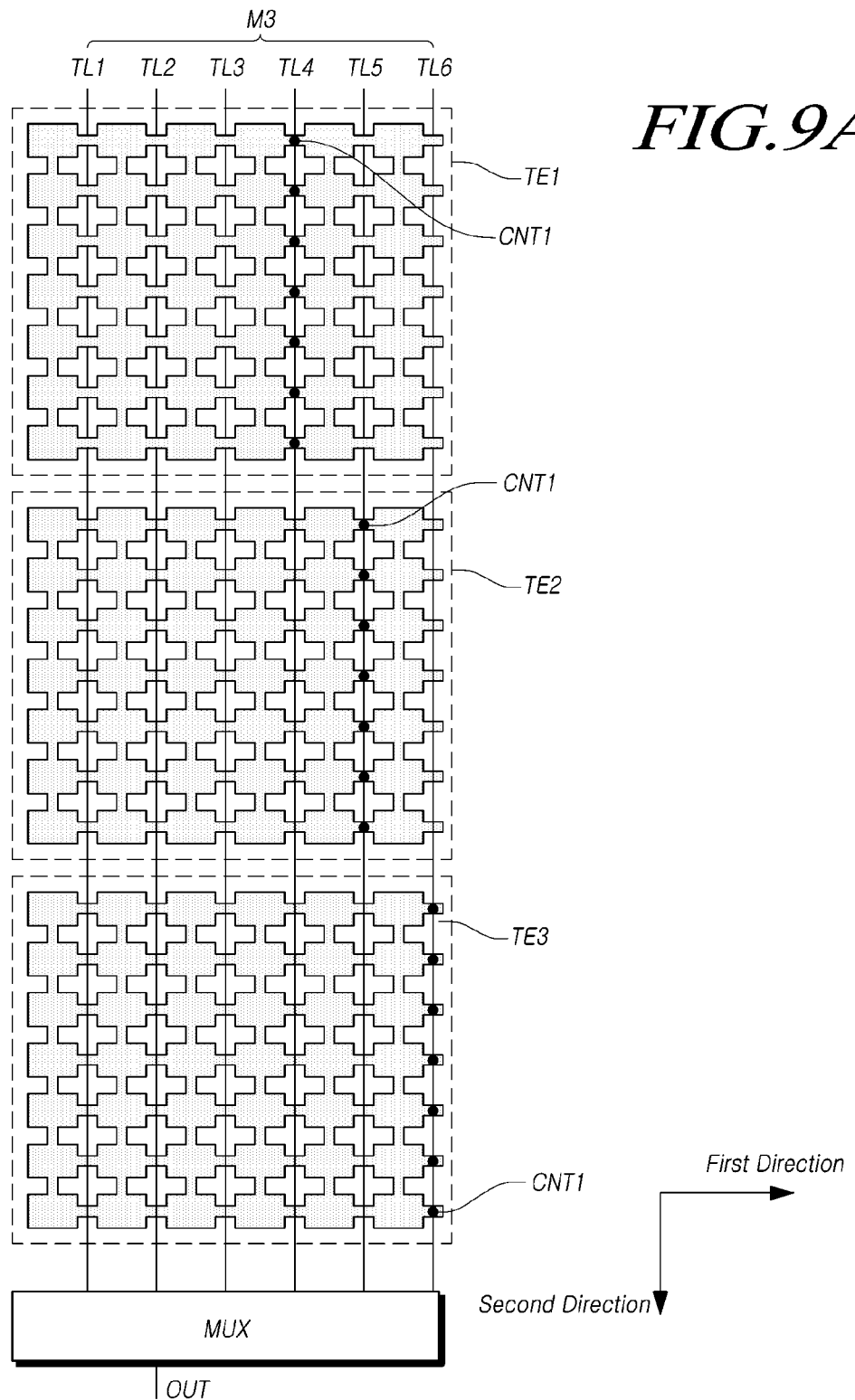
FIG. 9A is a plan view illustrating an example of touch electrodes disposed in the display device illustrated in FIG. 1.
Figure 9B:
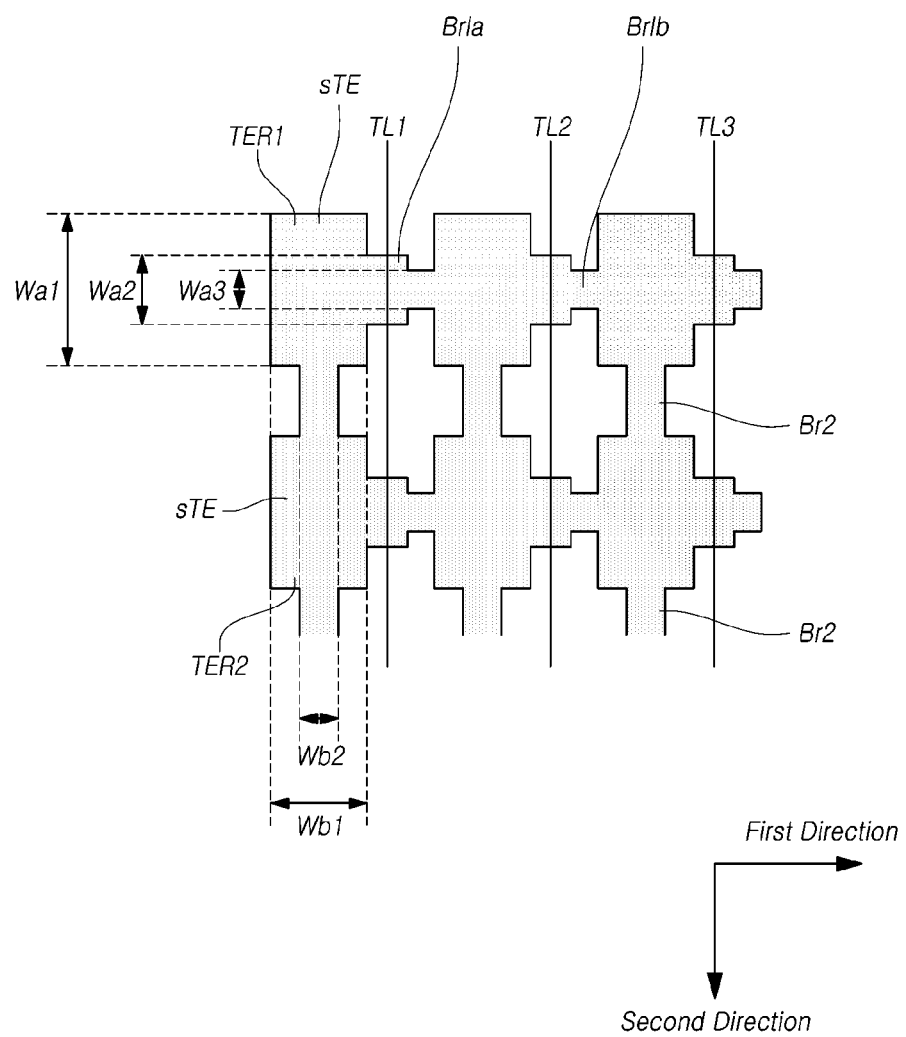
FIG. 9B is a plan view illustrating an example of touch electrode rows according to aspects of the present disclosure.

FIG. 9A is a plan view illustrating an example of touch electrodes disposed in the display device illustrated in FIG. 1. FIG. 9B is a plan view illustrating an example of touch electrode rows according to aspects of the present disclosure.

Referring to FIGS. 9A and 9B, the display device 100 may include a plurality of touch electrodes TEs. Each of the touch electrodes TE1, TE2, and TE3 may include a plurality of touch electrode rows TER arranged at predetermined intervals. Although it is illustrated that one touch electrode TE includes seven touch electrode rows TER in this example, the present disclosure is not limited thereto. A touch electrode row TER may include a plurality of sub-touch electrodes sTE and first connection portions Br1 for connecting the plurality of sub-touch electrodes sTE in a first direction. In addition, the touch electrodes TE1, TE2, and TE3 may overlap the plurality of touch wiring lines M3.

The plurality of touch wiring lines M3 may extend in a second direction and may be disposed at regular intervals in the first direction. In addition, the touch wiring lines M3 may overlap the first connection portions Br1 of the touch electrode row TER. Here, the number of the plurality of touch wiring lines M3 overlapping each of the touch electrodes TE1, TE2, and TE3 is six, but the present disclosure is not limited thereto. The width of the first connection portions Br1 in the second direction may be smaller than the width of the sub-touch electrode sTE in the second direction. The first connection portions Br1 may form parasitic capacitance with one overlapping touch wiring line. By forming the width of the first connection portions Br1 to be narrower than that of the sub-touch electrodes sTE, the magnitude of the parasitic capacitance formed between the first connection portions Br1 and the one wiring line can be reduced.

A first connection portion Br1 of a touch electrode row TER may include a first area Br1a overlapping a touch wiring line TL1, TL2, or TL3, and a second area Br1b connected to a neighboring sub-touch electrode sTE located in the same row. The width Wa2 of the first area Br1a in the second direction may be larger than the width Wa3 of the second area Br1b in the second direction. The first area Br1a may be provided with a contact hole CNT1, which is connected to the touch wiring line TL1. Therefore, an area where the contact hole CNT1 is to be disposed is secured in the first connection portion Br1a, and connection between the touch wiring line TL1 and the first connection portion Br1a may be facilitated.

In addition, one touch electrode row TER1 may include a second connection portion Br2 through which the touch electrode row TER1 is connected to another neighboring touch electrode row TER2 in a second direction. The second connection portion Br2 may be disposed in the other touch electrode row TER2 other than the one sub-touch electrode sTE such that another sub-touch electrode sTE is connected to the other touch electrode row TER2. The plurality of touch wiring lines M3 may extend in a second direction and may be disposed at regular intervals in the first direction. All of the touch electrode rows included in one touch electrode may be connected by the second connection portion. Accordingly, the magnitude of the internal resistance of the touch electrodes TE1, TE2, and TE3 including a plurality of touch electrode rows TER can be reduced by connecting the touch electrode rows TER in parallel. When the magnitude of the internal resistance of the touch electrodes TE1, TE2, and TE3 is small, the magnitude of the RC delay is small, so that the distortion of a signal transmitted to the display panel can be reduced even if a deviation in capacitance occurs. Therefore, the distortion of the signal generated by the touch electrodes TE1, TE2, and TE3 can be reduced.

Three touch electrodes TE1, TE2, and TE3 may be referred to as a first touch electrode TE1, a second touch electrode TE2, and a third touch electrode TE3 in the top to bottom direction, and six touch wiring lines M3 may be referred to as a first touch wiring line TL1, a second touch wiring line TL2, a third touch wiring line TL3, a fourth touch wiring line TL4, a fifth touch wiring line TL5, and a sixth touch wiring line TL6 in the left to right direction. The first touch electrode TE1 is connected to the fourth touch wiring line TL4, the second touch electrode TE2 is connected to the fifth touch wiring line TL5, the third touch electrode TE3 is connected to the sixth touch wiring line TL6. The first to third touch wiring lines TL1 to TL3 may be connected to other unillustrated touch electrodes.

The first touch electrode TE1 may be connected to the first connection portions Br1 disposed at portions overlapping the fourth touch wiring line TL4 through contact holes CNT1, the second touch electrode TE2 may be connected to the first connection portions Br1 disposed at portions overlapping the fifth touch wiring line TL5 through contact holes CNT1, and the third touch electrode TE3 may be connected to the first connection portions Br1 disposed at portions overlapping the sixth touch wiring line TL6 through contact holes CNT1. Accordingly, each of the plurality of touch electrode rows TER forming one touch electrode TE is capable of transmitting/receiving touch signals through the same touch wiring line. Here, since the contact holes CNT1 for connecting the touch electrodes and the touch wiring lines can be formed in a single process, the same identification number is given thereto.

Referring to FIG. 9B, a first connection portion Br1 of a touch electrode row TER may include a first area Br1$a$ overlapping a touch wiring line TL1, TL2, or TL3, and a second area Br1$b$ connected to a neighboring sub-touch electrode sTE located in the same row. The width Wa2 of the first area Br1$a$ in the second direction may be larger than the width Wa3 of the second area Br1$b$ in the second direction. The first area Br1$a$ may be provided with a contact hole CNT1, which is connected to the touch wiring line TL1. Therefore, an area where the contact hole CNT1 is to be disposed is secured in the first connection portion Br1, and connection between the touch wiring line TL1 and the first area Br1$a$ may be facilitated. Whereas, since no contact hole is disposed in the second connection portion Br2, the width of the second connection portion Br2 may be constant. However, the present disclosure is not limited thereto. The width Wb2 of the second connection portion Br2 in the first direction may be narrower than the width Wb1 of the sub-touch electrode in the first direction in order to reduce the area overlapping a circuit unit.

In one aspect, the plurality of touch wiring lines M3 may be connected to one multiplexer MUX. The multiplexer MUX may select a signal to be transmitted to a plurality of terminals by a selection signal and may output the selected signal to one terminal, and may select one of the plurality of terminals by a selection signal and may output a signal to be input to one terminal to the selected terminal. Due to this, one output stage OUT of the sensing driver 130 illustrated in FIG. 1 is capable of outputting a plurality of touch signals sequentially, and capable of transmitting a plurality of touch signals to different touch wiring lines M3 through the multiplexer MUX.

One output stage OUT of the sensing driver 130 is capable of receiving a plurality of touch signals, transmitted from the plurality of touch wiring lines M3 through the multiplexer MUX, at different times. In the display device 100, it is possible to reduce the number of output stages OUT of the sensing drivers 130 by using the multiplexer MUX. Accordingly, the display device 100 is capable of using sensing drivers 130, which are smaller in size compared to the number of the touch wiring lines M3, so that the bezel corresponding to the rim portion of the display device 100 can be reduced.

FIG. 10 is a plan view illustrating an example of a display device in which touch electrodes illustrated in FIG. 9A are disposed.

Referring to FIG. 10, the display device 100 may include a plurality of light-emitting areas and a circuit area including a plurality of circuit units 1011 to 1018, which correspond to the plurality of light-emitting areas, respectively. The plurality of light-emitting areas and the plurality of circuit units may be disposed on the transparent substrate 100$a$. The circuit units 1011 to 1018 may correspond to the pixel circuit of a subpixel illustrated in FIG. 3. However, the configurations of the circuit units 1011 to 1018 are not limited thereto.

FIG. 10 illustrates two pixels of two display devices, in which the two pixels are arranged in a second direction. In the light-emitting areas, the sub-touch electrodes sTE1, sTE2, sTE3, and sTE4, which correspond to one pixel, and the anode electrodes 115$a$ may be disposed to overlap each other. In the light-emitting areas, the sub-touch electrodes sTE5, sTE6, sTE7, and sTE8 corresponding to another pixel and the anode electrodes 115$a$ may be disposed to overlap each other. One sub-touch electrode sTE1 may be connected to a neighboring sub-touch electrode sTE2 through a first connection portion Br1. When the sub-touch electrodes sTE1, sTE2, sTE3, and sTE4 are connected through the first connection portions Br1, one touch electrode row TER1 illustrated in FIG. 9B may be formed. When the sub-touch electrodes sTE5, sTE6, sTE7, and sTE8 are connected through the first connection portions Br1, another touch electrode row TER2 illustrated in FIG. 9B may be formed. The sub-touch electrodes sTE1, sTE2, sTE3, and sTE4 included in one touch electrode row TER1 and the sub-touch electrodes sTE5, sTE6, sTE7, and sTE8 included in the other touch electrode row TER2 may be transparent electrodes 101$a$.

The circuit area may include first circuit units 1011 to 1014 configured to supply a driving current to the anode electrodes 115$a$, and a first power line VL1, a reference power line VL2, data lines DL1 to DL4, and gate lines GL1 and GL2 configured to transmit power and signals to the first circuit units 1011 to 1014. In addition, the circuit area may include second circuit units 1015 to 1018 and gate lines GL3 and GL4 configured to supply a driving current to the anode electrodes. In addition, the second circuit units 1015 to 1018 may receive power and signals through the first power line VL1, the reference power line VL2, and the data lines DL1 to DL4.

The first circuit units 1011 to 1014 and the second circuit unit 1015 to 1018 may be connected to the first power line VL1, the reference power line VL2, the data lines DL1 to DL4, the gate lines GL1 to GL4 in the same type as FIG. 6, and a detailed description thereof will be omitted.

Figure 11:
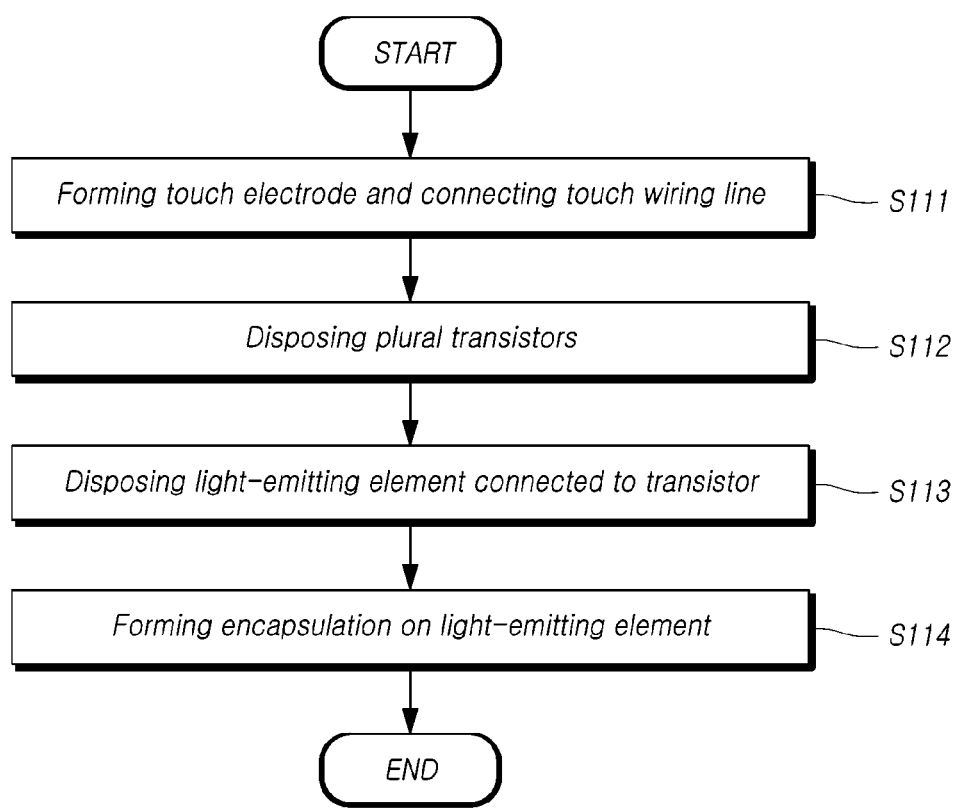
FIG. 11 is a flowchart illustrating an example of a method of manufacturing a display device according to aspects of the present disclosure.

FIG. 11 is a flowchart illustrating an example of a method of manufacturing a display device according to aspects of the present disclosure.

Referring to FIG. 11, a method of manufacturing a display device includes forming a plurality of touch electrode rows extending in a first direction with a predetermined interval on a transparent substrate, and connecting one of the plurality of touch electrode rows to a touch wiring line at one point thereof (S111). The touch electrode rows may include a transparent electrode. The transparent electrode may be formed of any one of Indium Tin Oxide (ITO) and Indium Zinc Oxide (IZO). However, the present disclosure is not limited thereto.

In one aspect, one touch electrode row may include a plurality of sub-touch electrodes and first connection units for connecting the sub-touch electrodes in the first direction. The width of the first connection portions in the second direction may be narrower than the width of the sub-touch electrodes in the second direction. Therefore, the magnitude of the parasitic capacitance between the first connection portions and wiring lines overlapping the first connection portions can be reduced.

In addition, one touch electrode row may include second connection portions each connected to a sub-touch electrode of a neighboring touch electrode row. The width of the second connection portions in the first direction may be narrower than the width of the sub-touch electrodes in the first direction. Therefore, the magnitude of the parasitic capacitance between the second connection portions and wiring lines overlapping the second connection portions can be reduced.

The first connection portions and the second connection portions may include the same material as the material used for the sub-touch electrodes. However, the present disclosure is not limited thereto.

In addition, a plurality of transistors and wiring lines configured to apply signals to the plurality of transistors may be formed above the touch wiring lines (S112). The signals applied to the plurality of transistors may be a data signal, a gate signal, a first voltage, a second voltage, and a reference power. The second voltage may be ground. However, the present disclosure is not limited thereto. Further, in order to prevent light from being emitted to a transistor, a metal film may be disposed in an area overlapping the transistor. The transistor which overlaps the metal film may be the first transistor illustrated in FIG. 2. However, the present disclosure is not limited thereto. Further, the metal film may be used to form a jumping line for transmitting the first voltage and the reference power to the plurality of transistors.

In addition, a light-emitting element connected to at least one of the plurality of transistors may be disposed (S113). The light-emitting element may include an anode electrode, a cathode electrode, and an organic light-emitting layer disposed between the anode electrode and the cathode electrode. The anode electrode may be connected to the drain of the transistor. The cathode electrode may be a common electrode. The anode electrode and the cathode electrode may be transparent electrodes.

An encapsulation may be disposed on the light-emitting layer (S114). The light-emitting layer is capable of being protected by the encapsulation. The encapsulation may be disposed on the light-emitting layer by applying an adhesive layer on the cathode electrode and then bonding the encapsulation. The adhesive layer may include epoxy. However, the present disclosure is not limited thereto. The encapsulation may be made of a metal material. The encapsulation may be opaque.

Although an aspect of the present disclosure has been described for illustrative purposes, those skilled in the art will appreciate that various modifications, additions and substitutions are possible, without departing from the scope and spirit of the disclosure as disclosed in the accompanying claims. Therefore, exemplary aspects of the present disclosure have been described for the sake of brevity and clarity. The scope of the present disclosure shall be construed on the basis of the accompanying claims in such a manner that all of the technical ideas included within the scope equivalent to the claims belong to the present disclosure.

What is claimed is:

1. A display device comprising:
   a transparent substrate;
   a circuit unit disposed on the transparent substrate and including a plurality of circuit areas and a plurality of light-emitting areas corresponding to the plurality of circuit areas;
   a touch electrode including a plurality of touch electrode rows, wherein one of the plurality of touch electrode rows includes a plurality of sub-touch electrodes disposed to overlap the plurality of light-emitting areas and a plurality of first connection portions connected with the plurality of sub-touch electrodes in a first direction;
   a touch wiring line extending in a second direction and supplying a touch signal to one sub-touch electrode of the plurality of touch electrode rows;
   a color filter disposed between the circuit unit and a light-emitting layer and overlapping with the plurality of light-emitting areas,
   wherein a width of the first connection portions in the second direction is narrower than a width of the sub-touch electrodes in the second direction, and
   wherein each of the first connection portions includes a first area overlapping the touch wiring line and a second area connected to the sub-touch electrodes, wherein a width of the first area in the second direction is wider than a width of the second area in the second direction.

2. The display device of claim 1, wherein each of the sub-touch electrodes includes a second connection portion connecting neighboring touch electrode rows among the plurality of the touch electrode rows.

3. The display device of claim 2, wherein a width of the second connection portions in the first direction is narrower than a width of the sub-touch electrodes in the first direction.

4. The display device of claim 1, wherein the light-emitting layer is disposed on the circuit unit.

5. The display device of claim 4, further comprising an encapsulation disposed on the light-emitting layer.

6. The display device of claim 1, further comprising a metal layer disposed between the transparent substrate and the circuit areas to overlap the plurality of circuit areas.

7. A display device comprising:
   a plurality of touch electrode rows extending in a first direction and disposed at a predetermined interval;
   a plurality of touch wiring lines extending in a second direction and receiving a touch driving signal;
   a plurality of circuit units disposed between the plurality of touch electrode rows to overlap with each other;

a plurality of light emitting areas to receive a signal from the plurality of circuit units so as to emit light, respectively; and a color filter disposed between the plurality of circuit units and a light-emitting layer and overlapping with the plurality of light-emitting areas, wherein, among the plurality of touch electrode rows, one touch electrode row includes a plurality of sub-touch electrodes and a plurality of first connection portions having a width narrower than a width of the sub-touch electrodes, wherein the plurality of touch wiring lines are disposed to overlap the first connection portions, and, among the plurality of touch wiring lines, one touch wiring line is in contact with the touch electrode row in at least one of the first connection portions, wherein a width of the sub-touch electrodes in the second direction is wider than the width of the first connection portions in the second direction, and wherein, among the plurality of touch electrode rows, one touch electrode row includes a second connection portion connected to another touch electrode row neighboring in the second direction, and a width of the second connection portion is narrower than a width of the sub-touch electrodes.

8. The display device of claim 7, wherein the plurality of circuit units are disposed between the plurality of touch electrode rows to overlap with each other.

9. The display device of claim 8, wherein each sub-touch electrode of the plurality of touch electrode rows is disposed to overlap the light-emitting area.

10. The display device of claim 8, further comprising a plurality of wiring lines transmitting a data signal, a gate signal, and a first voltage and connected to the circuit units, wherein the plurality of wiring lines are disposed to overlap the plurality of touch wiring lines.

11. The display device of claim 10, further comprising a metal layer disposed at an upper end of the circuit units and including a jumping line jump the first voltage and the upper end of the circuit units.

12. A method of manufacturing a display device, the method comprising:

forming, a touch electrode including a plurality of touch electrode rows extending in a first direction at a predetermined interval on a transparent substrate, and connecting a touch wiring line to a point of the touch electrode;

forming, on the touch wiring line, a plurality of transistors and a plurality of wiring lines applying a signal to the plurality of transistors;

forming a light-emitting element connected to at least one of the plurality of transistors;

forming an encapsulation on the light-emitting element; and forming a color filter between the transistor and the light-emitting element, wherein the one touch electrode row includes a plurality of sub-touch electrodes and a first connection portion having a narrower width in a second direction than the plurality of sub-touch electrodes, and wherein the one touch electrode row includes a second connection portion connected to a sub-touch electrode of a neighboring touch electrode row, and a width of the second connection portion in a first direction is narrower than a width of the sub-touch electrode in a first direction.

* * * * *